(12) United States Patent
Li et al.

(10) Patent No.: US 7,749,474 B2
(45) Date of Patent: *Jul. 6, 2010

(54) CATALYST COMPOSITION FOR USE IN A LEAN $NO_x$ TRAP AND METHOD OF USING

(75) Inventors: John Li, Canton, MI (US); William Watkins, Toledo, OH (US); Christian Goralski, Jr., St. Paul, MN (US); Harendra Gandhi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1298 days.

This patent is subject to a terminal disclaimer.

(21) Appl. No.: 11/157,192

(22) Filed: Jun. 20, 2005

(65) Prior Publication Data

US 2006/0034741 A1    Feb. 16, 2006

Related U.S. Application Data (60) Provisional application No. 60/601,069, filed on Aug. 12, 2004, provisional application No. 60/601,027, filed on Aug. 12, 2004, provisional application No. 60/601,049, filed on Aug. 12, 2004, provisional application No. 60/600,933, filed on Aug. 12, 2004.

(51) Int. Cl.
*B01D 53/65* (2006.01)
*B01J 23/00* (2006.01)
*B01J 23/58* (2006.01)

(52) U.S. Cl. .................. 423/213.5; 502/328; 502/325
(58) Field of Classification Search .................. None
See application file for complete search history.

(56) References Cited

U.S. PATENT DOCUMENTS

| | | |
|---|---|---|
| 3,819,536 A | 6/1974 | Dalla Betta et al. |
| 3,972,837 A | 8/1976 | Acres et al. |
| 4,001,371 A | 1/1977 | Remeika et al. |
| 4,049,583 A | 9/1977 | Lauder |
| 4,077,913 A | 3/1978 | Acres et al. |
| 4,089,810 A | 5/1978 | Diwell et al. |
| 4,127,510 A | 11/1978 | Harrison et al. |
| 4,162,235 A | 7/1979 | Acres et al. |
| 4,200,554 A | 4/1980 | Lauder |
| 4,956,330 A | 9/1990 | Elliott et al. |
| 5,064,803 A | 11/1991 | Nunan |
| 5,427,753 A | 6/1995 | Miura et al. |
| 5,435,981 A | 7/1995 | Ichiki et al. |
| 5,449,504 A | 9/1995 | Kasahara et al. |
| 5,589,147 A | 12/1996 | Farnos et al. |
| 5,597,771 A | 1/1997 | Hu et al. |
| 5,635,142 A | 6/1997 | Ichiki et al. |
| 5,747,401 A | 5/1998 | Cuif |
| 5,747,410 A | 5/1998 | Muramatsu et al. |
| 5,756,057 A | 5/1998 | Tsuchitani et al. |
| 5,837,212 A | 11/1998 | Hepburn et al. |
| 5,879,645 A | 3/1999 | Park et al. |
| 5,972,821 A | 10/1999 | Nojima et al. |
| 5,989,507 A | 11/1999 | Sung et al. |
| 5,992,142 A | 11/1999 | Pott |
| 6,003,303 A | 12/1999 | Peter-Hoblyn et al. |
| 6,087,298 A | 7/2000 | Sung et al. |
| 6,174,835 B1 | 1/2001 | Naito et al. |
| 6,350,423 B1 | 2/2002 | Aoyama |
| 6,391,822 B1 | 5/2002 | Dou et al. |
| 6,419,890 B1 | 7/2002 | Li |
| 6,477,834 B1 | 11/2002 | Asanuma et al. |
| 6,497,848 B1 | 12/2002 | Deeba et al. |
| 6,531,425 B2 | 3/2003 | Golden |
| 6,555,492 B2 | 4/2003 | Faber et al. |
| 6,620,762 B2 | 9/2003 | Tan et al. |
| 6,699,448 B2 | 3/2004 | Wu et al. |
| 6,777,370 B2 | 8/2004 | Chen |
| 6,821,925 B2 | 11/2004 | Carruthers et al. |
| 6,852,666 B1 | 2/2005 | Bouly et al. |
| 6,864,212 B2 | 3/2005 | Tanev |
| 6,923,945 B2 | 8/2005 | Chen |
| 7,213,395 B2 | 5/2007 | Hu et al. |
| 2002/0076373 A1 | 6/2002 | Molinier et al. |

(Continued)

FOREIGN PATENT DOCUMENTS

EP    0 625 633 A1    11/1994

(Continued)

OTHER PUBLICATIONS

Gellings, Paul J. et al., "Solid state aspects of oxidation catalysis" Catalysis Today 58, Elsevier Science B.V., 2000, pp. 1-53.

(Continued)

*Primary Examiner*—Melvin C Mayes
*Assistant Examiner*—Sheng Han
(74) *Attorney, Agent, or Firm*—Damian Porcari; Dinsmore & Shohl LLP (57) ABSTRACT

A lean $NO_x$ trap composition. The lean $NO_x$ trap composition utilizes ruthenium in place of higher cost metals such as platinum. The lean $NO_x$ trap composition provides high $NO_x$ storage efficiency and high $NO_x$ conversion efficiency when incorporated in a lean $NO_x$ trap. A method of removing harmful gases using the lean $NO_x$ trap composition is also described.

25 Claims, 5 Drawing Sheets

U.S. PATENT DOCUMENTS

| | | |
|---|---|---|
| 2002/0103078 A1 | 8/2002 | Hu et al. |
| 2002/0155040 A1 | 10/2002 | Sakanushi et al. |
| 2003/0021745 A1 | 1/2003 | Chen |
| 2003/0103886 A1 | 6/2003 | Dou |
| 2003/0106306 A1 | 6/2003 | Nakatani et al. |
| 2003/0139288 A1 | 7/2003 | Cai et al. |
| 2003/0147796 A1 | 8/2003 | Suga et al. |
| 2003/0154713 A1 | 8/2003 | Hiratsuka et al. |
| 2003/0172646 A1 | 9/2003 | Hiratsuka et al. |
| 2003/0175192 A1 | 9/2003 | Hu et al. |
| 2003/0181324 A1 | 9/2003 | Hotta et al. |
| 2003/0198582 A1 | 10/2003 | Golden |
| 2004/0043343 A1* | 3/2004 | Kamijo .......................... 431/2 |
| 2004/0077492 A1* | 4/2004 | Yaluris et al. ............... 502/302 |
| 2004/0198595 A1* | 10/2004 | Chen .......................... 502/328 |
| 2004/0209772 A1 | 10/2004 | Fukunaga et al. |
| 2005/0148463 A1* | 7/2005 | Jen et al. .................... 502/325 |
| 2006/0034741 A1 | 2/2006 | Li et al. |
| 2006/0035782 A1 | 2/2006 | Jen et al. |

FOREIGN PATENT DOCUMENTS

| | | |
|---|---|---|
| EP | 0 982 487 A1 | 3/2000 |
| EP | 1 241 329 A2 | 9/2002 |
| EP | 1 302 647 A2 | 4/2003 |
| EP | 1 318 282 A1 | 6/2003 |
| EP | 1 413 718 A1 | 4/2004 |
| JP | 2001-009271 | 1/2001 |
| WO | WO 00/50168 | 8/2000 |
| WO | WO 01/09271 A1 | 2/2001 |
| WO | WO 02/09852 A2 | 2/2002 |
| WO | WO 02/058825 A2 | 8/2002 |
| WO | WO 02/083301 A2 | 10/2002 |
| WO | WO 03/008095 A2 | 1/2003 |
| WO | WO 03/040259 A2 | 5/2003 |

OTHER PUBLICATIONS

Kass et al, "Selective Catalytic Reduction of Diesel Engine NOx Emissions Using Ethanol as a Reductant" Proceedings: 2003 DEER Conference, U.S. Dept. of Energy 9th Diesel Engine Emissions Reduction Conference, Newport, Rhode Island, Aug. 24 to 28, 2003, pp. 1-8.

Office Action for U.S. Appl. No. 10/710,920 dated Apr. 2, 2008.

Office Action for U.S. Appl. No. 11/156,898 dated Mar. 6, 2009.

Office Action for U.S. Appl. No. 10/710,920 dated Dec. 5, 2008.

Office Action for U.S. Appl. No. 11/156,898 dated Jul. 31, 2008.

Office Action for U.S. Appl. No. 11/156,898 dated Dec. 3, 2008.

Office Action of U.S. Appl. No. 10/710,922 dated Dec. 15, 2005.

Notice of Allowance of U.S. Appl. No. 10/710,922 dated Jun. 14, 2006.

Supplemental Notice of Allowability of U.S. Appl. No. 10/710,922 dated Sep. 15, 2006.

Restriction Election Requirement of U.S. Appl. No. 11/539,722 dated Jan. 28, 2009.

Office Action of U.S. Appl. No. 11/539,722 dated May 27, 2009.

Notice of Allowance of U.S. Appl. No. 11/156,898 dated Jun. 3, 2009.

* cited by examiner

CATALYST COMPOSITION FOR USE IN A LEAN $NO_x$ TRAP AND METHOD OF USING

BACKGROUND OF THE INVENTION

This application claims the benefit of provisional application Ser. No. 60/601,069, entitled Catalyst Composition for Use in a Lean $NO_x$ Trap, filed Aug. 12, 2004; provisional application Ser. No. 60/601,027, entitled Catalyst Composition for Use in a Lean $NO_x$ Trap, filed Aug. 12, 2004; provisional application Ser. No. 60/601,049, entitled Catalyst Composition for Use in a Lean $NO_x$ Trap, filed Aug. 12, 2004; and provisional application Ser. No. 60/600,933, entitled Method of Making a Catalyst Composition for Use in a Lean $NO_x$ Trap, filed Aug. 12, 2004, all of which are incorporated herein by reference.

The present invention relates to a catalyst composition for use in a lean $NO_x$ trap, and more particularly, to a low cost catalyst composition for use in a lean $NO_x$ trap for use in lean-burn engines such as gasoline and diesel engines and to methods of using such a composition.

Environmental concerns and government regulations have led to efforts to improve the removal of noxious combustion by-products from vehicle engine exhausts. Typically, the combustion by-products include carbon monoxide, hydrocarbons, sulfur oxides and various nitrogen oxides ($NO_x$). In recent years, lean-burn engines such as gasoline and diesel engines have become more widely used as they offer improved fuel economy. However, because such engines operate under fuel-lean conditions, it is difficult to achieve reduction and removal of $NO_x$ in the oxidizing atmosphere of the engine exhaust. One solution to this problem has been the use of lean $NO_x$ traps ("LNT"), which typically include a catalyst comprising one or more precious metals such as platinum (Pt), palladium (Pd), or rhodium (Rh), and an alkali earth metal such as barium, and which are provided on a support material such as alumina. The precious metal catalysts are capable of absorbing or storing nitrogen oxides during lean-burn engine operation (where there is excess oxygen) and releasing and converting them when the oxygen concentration in the exhaust gas is lowered.

However, while such traps have been effective in the removal of $NO_x$ from the exhaust of lean burn engines, they require high loadings of precious metals such as platinum, which are very expensive. Accordingly, the high cost of such traps has prevented their wide application.

Attempts have been made to develop lean $NO_x$ traps with non-precious metals in an effort to reduce costs. See, for example, U.S. Pat. No. 5,837,212, which teaches a catalyst for use in a lean $NO_x$ trap comprised of manganese and potassium. However, while such a trap has effective NO storage efficiency, the trap does not effectively convert the stored $NO_x$ to $N_2$. It is very important for the catalyst materials to exhibit good $NO_x$ storage efficiency as well as effective $NO_x$ conversion because low conversion efficiency will result in higher $NO_x$ emissions. By "storage efficiency," we mean the efficiency of the LNT to store $NO_x$ during the lean period. By "conversion efficiency" we mean the efficiency of the LNT to convert $NO_x$ during both the lean and rich periods.

Ruthenium has also been proposed for use as a reducing catalyst component, typically in combination with other precious metals. See, for example, U.S. Pat. No. 5,756,057. While ruthenium is also considered a precious metal, it is much lower in cost than platinum and other precious metals. However, although ruthenium has generally been regarded as an effective reducing catalyst for $NO_x$, we have not seen ruthenium being used as a catalyst in lean $NO_x$ traps because its effectiveness for NO oxidation, which is the first step in reactions involving a lean $NO_x$ trap, has not been demonstrated.

Accordingly, there is a need in the art for a catalyst composition for use in a lean $NO_x$ trap which is low in cost, which exhibits high $NO_x$ storage efficiency, and high ($NO_x$ to $N_2$) conversion efficiency.

SUMMARY OF THE INVENTION

The present invention meets this need by providing a lean $NO_x$ trap composition utilizing ruthenium in place of higher cost precious metals such as platinum. The lean $NO_x$ trap composition provides high $NO_x$ storage efficiency and high $NO_x$ conversion efficiency when incorporated in a lean $NO_x$ trap.

According to one aspect of the invention, a lean $NO_x$ trap composition is provided. The lean $NO_x$ trap composition includes a support material; a ruthenium catalyst wherein the ruthenium catalyst is free of other precious metals; a $NO_x$ absorbent material comprising an alkaline earth metal; and an alkali metal; wherein the lean $NO_x$ trap composition has a storage efficiency of at least 70% at a temperature in a range of from about 350° C. to about 500° C., and a conversion efficiency of at least 60% at a temperature in a range of from about 350° C. to about 500° C.

Another aspect of the invention involves a method of removing harmful gases from an automobile exhaust containing $NO_x$, CO, and hydrocarbons. The method includes contacting a lean $NO_x$ trap composition with a first exhaust gas mixture comprising exhaust gases from an internal combustion engine operating in a fuel-lean condition, the lean $NO_x$ trap composition comprising: a support material; a ruthenium catalyst wherein the ruthenium catalyst is free of other precious metals; a $NO_x$ absorbent material comprising an alkaline earth metal; and an alkali metal; wherein the lean $NO_x$ trap composition has a storage efficiency of at least 70% at a temperature in a range of from about 350° C. to about 500° C., and a conversion efficiency of at least 60% at a temperature in a range of from about 350° C. to about 500° C.; and contacting the lean $NO_x$ trap composition with a second exhaust mixture comprising exhaust gases from the internal combustion engine operating in a fuel-rich condition.

DETAILED DESCRIPTION OF THE INVENTION

We have found that a ruthenium catalyst can effectively oxidize $NO_x$, as shown in commonly assigned application Ser. No. 11/156898, now U.S. Pat. No. 7,622,095, entitled Catalyst Composition for Use in a Lean $NO_x$ Trap and Method of Using, the disclosure of which is hereby incorporated by reference. The ruthenium catalyst demonstrates excellent $NO_x$ storage efficiency when it is incorporated into a lean $NO_x$ trap. The use of ruthenium allows lean $NO_x$ traps to be produced at much lower cost than previous traps which incorporate higher cost precious metals.

The catalyst composition can comprise a ruthenium catalyst, such as ruthenium or ruthenium oxide, in combination with an alkaline earth metal on a support material. The ruthenium catalyst component functions to oxidize NO to $NO_2$ and to reduce $NO_x$ to $N_2$. It is generally present in an amount of about 0.1 to about 10% by weight of washcoat, typically about 0.3 to about 5% by weight of washcoat, or about 0.5 to about 3% by weight of washcoat. The ruthenium catalyst component can be prepared from a chlorine-free precursor, if desired.

The alkaline earth metal functions to absorb $NO_x$ and is generally present in an amount of about 5 to about 50% by weight of washcoat, or about 5 to about 30% by weight of washcoat, or about 5 to about 20% by weight of washcoat. The alkaline earth metal is typically barium. Suitable barium precursors include, but are not limited to, barium oxide, barium carbonate, barium nitrate, or barium acetate.

One problem we encountered in developing a ruthenium LNT was the occurrence of rich $NO_x$ spikes, i.e., some of the $NO_x$ stored during lean engine operation may escape without conversion at the point the feedgas is switched from lean to rich operation. Such rich $NO_x$ spikes lead to a reduction in the overall $NO_x$ conversion efficiency. In current lean $NO_x$ traps which utilize precious metal catalysts, this problem is typically solved by adjusting the amounts of precious metals in the catalyst composition, e.g., increasing the precious metal loading and/or by adjusting the feedgas air/fuel ratio. However, it would be desirable to eliminate these rich spikes without adding expensive precious metals or employing complicated feedgas controls.

We observed that a significant rich $NO_x$ spike occurred when the feedgas was switched from lean operation to rich operation in Ru—Ba LNTs. We believe this $NO_x$ spike may occur due to the slow redox transition of the active Ru sites. We discovered that the addition of an alkali metal to the catalyst composition removes the rich spikes so that the total overall $NO_x$ conversion efficiency is significantly improved.

Suitable alkali metals include, but are not limited to, cesium, lithium, or potassium. A particularly effective alkali metal is potassium. The alkali metal is generally present in an amount of from about 5 to about 50% by weight of washcoat, or about 5 to about 30% by weight of washcoat, or about 5 to about 20% by weight of washcoat. The alkali metal can be applied using a suitable alkali metal precursor.

Figure 2:
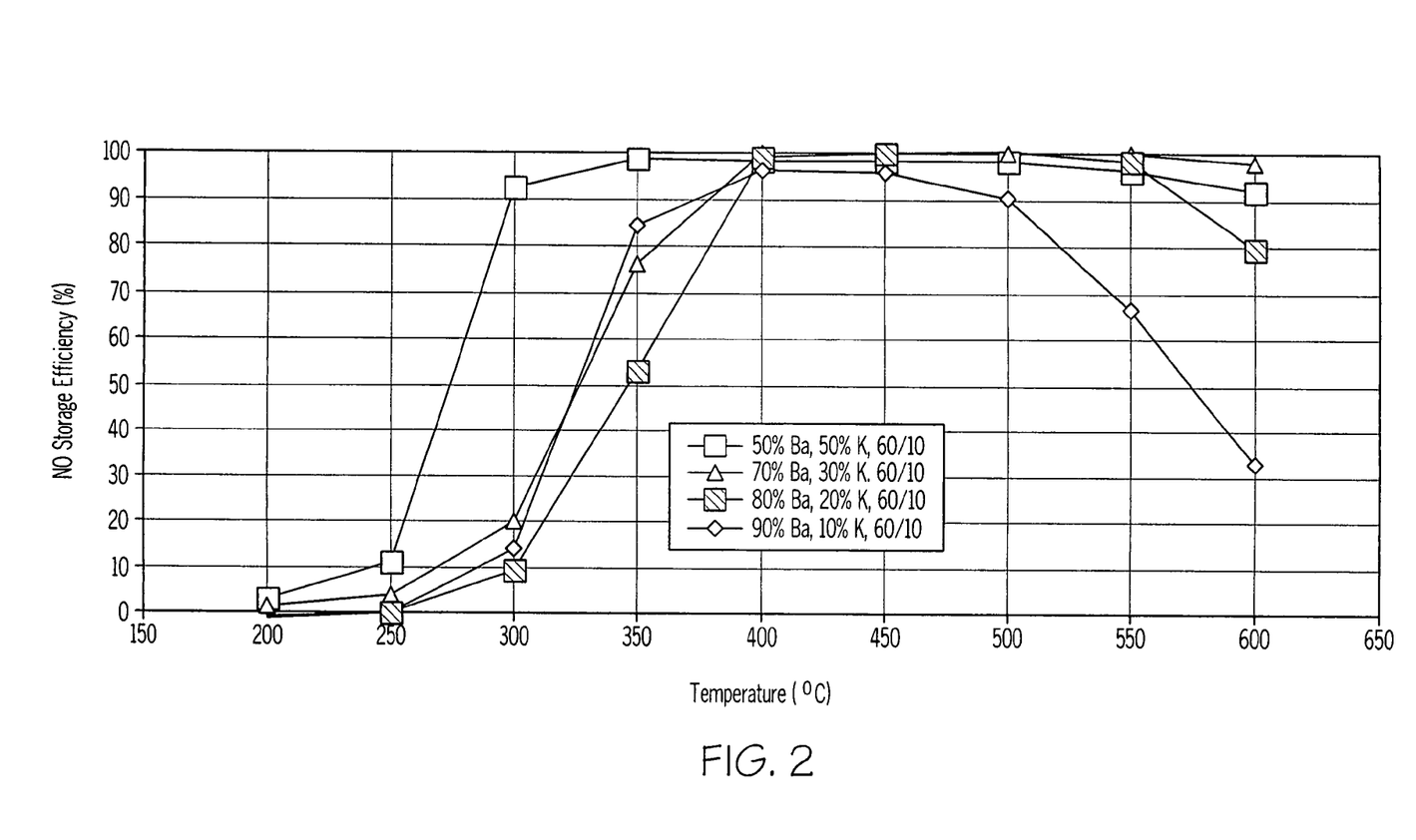
FIG. 2 is a graph illustrating $NO_x$ storage efficiency using varying ratios of Ba and K in the catalyst composition.
Figure 3:
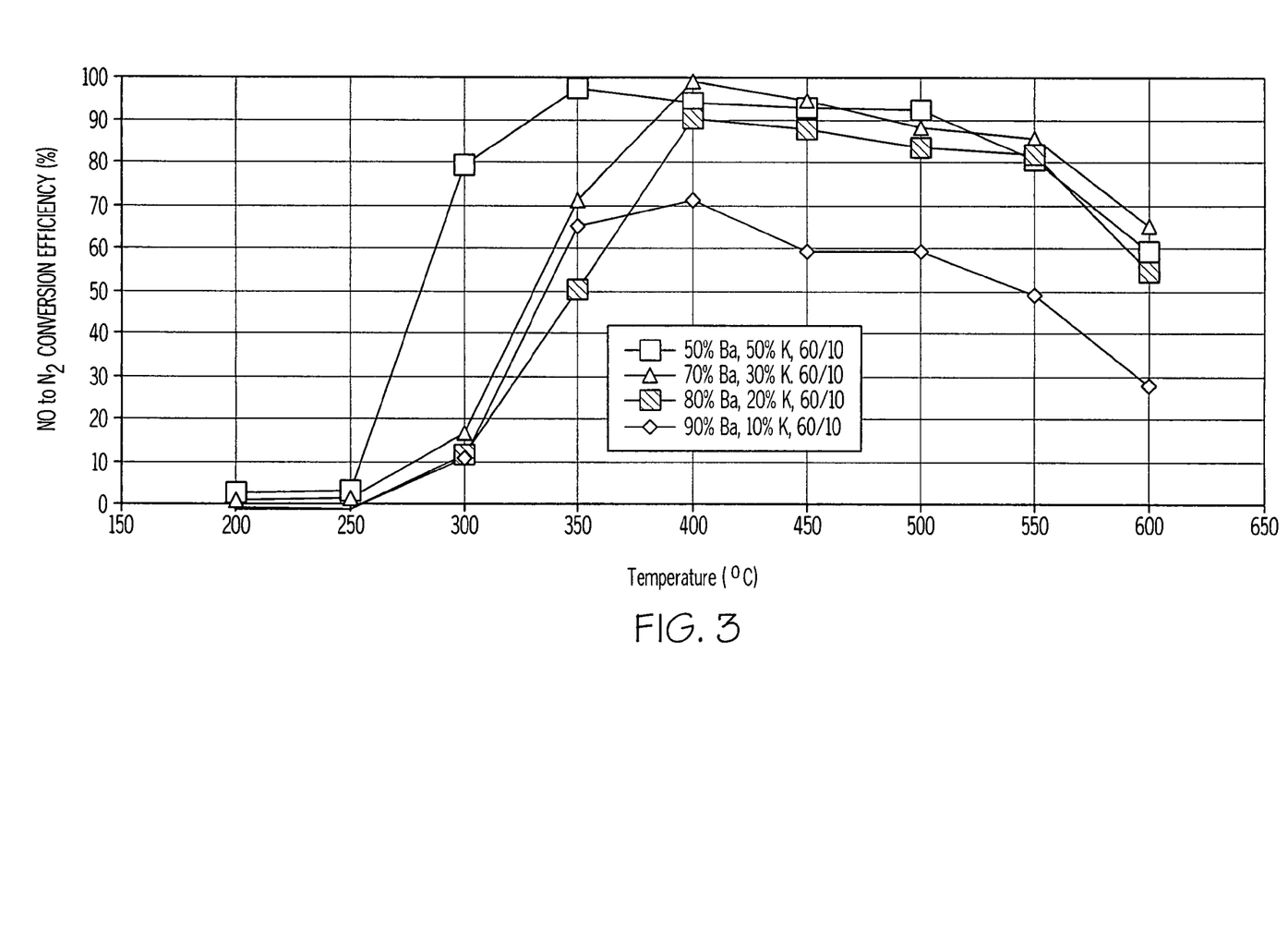
FIG. 3 is a graph illustrating overall $NO_x$ conversion efficiency using varying ratios of Ba and K in the catalyst composition of the present invention.

Generally, the weight ratio of alkaline earth metal to alkali metal is between about 90:10 to about 10:90, typically about 80:20 to about 20:80, or about 60:40 to about 40:60, or about 55:45 to about 45:55. As shown in FIGS. 2 and 3, the $NO_x$ storage efficiency and overall efficiency (including storage and reduction cycles) of $NO_x$ traps prepared using a catalyst composition containing Ru, Ba, and K is significantly higher when using a 1:1 (50:50) ratio of Ba—K.

The support material of the catalyst composition provides support to the catalyst and $NO_x$ absorbent components. Suitable support materials for use in the present invention include, but are not limited to, $Al_2O_3$, $SiO_2$, $TiO_2$, and zeolites. An alumina support is commonly used.

The catalyst composition may further include the use of stabilizers which provide thermal stability to the composition. Suitable stabilizers include, but are not limited to, rare earth oxides, such as lanthanum and cerium, and manganese, and zirconium. Other suitable thermal stabilizers include those disclosed in commonly assigned application Ser. No. 10/710,920, pending, entitled Processing Methods And Formulations To Enhance Stability Of Lean $NO_x$ Trap Catalysts Based On Alkali- And Alkaline Earth Metal Compounds and commonly assigned application Ser. No. 10/710,922, now U.S. Pat. No. 7,137,249, entitled Thermally Stable Lean $NO_x$ Trap, the disclosures of which are hereby incorporated by reference.

Generally, the lean $NO_x$ trap composition has a storage efficiency of at least 70% at a temperature in a range of from about 350° C. to about 500° C., and a conversion efficiency of at least 60% at a temperature in a range of from about 350° C. to about 500° C. It can have a storage efficiency of at least 80% at a temperature in a range of from about 350° C. to about 500° C., and a conversion efficiency of at least 70% at a temperature in a range of from about 350° C. to about 500° C.; or a storage efficiency of at least 90% at a temperature in a range of from about 300° C. to about 500° C., and a conversion efficiency of at least 90% at a temperature in a range of from about 350° C. to about 500° C.; or a storage efficiency of at least 95% at a temperature in a range of from about 350° C. to about 550° C., and a conversion efficiency of at least 95% at a temperature in a range of from about 350° C. to about 450° C.

The catalyst composition of the present invention can be incorporated into a lean $NO_x$ trap by any suitable process. A washcoating process will be described, although other processes could be used. The support material (for example, aluminum oxide) is first washcoated onto a monolithic substrate. Suitable substrates for use in the present invention include, but are not limited to, cordierite and metallic substrates. In order to prevent any possible interaction between the alkali metal and the substrate, it may be desirable to modify the surface of the substrate before washcoating. For example, the substrate can be coated with a protective layer, such as silica or similar materials.

The substrate is preferably repeatedly washcoated with the support material until a washcoat weight of 20% to 45% is achieved. After each deposition, the substrate is dried at about 80° C. for about six hours and then calcined at temperatures up to about 600° C. for about six hours. When the washcoat level is achieved, a solution of the ruthenium catalyst composition is prepared. The solution is deposited onto the substrate as a percentage of the washcoat. The ruthenium can be deposited two to three times to ensure a uniform distribution. After each deposition of the catalyst, the substrate is dried at about 80° C. for about six hours and then calcined under reducing conditions at temperatures up to about 600° C. for about six hours. After the catalyst component has been applied, the alkaline earth metal and alkali metal are then prepared as a solution. The amounts of alkaline earth metal and alkali metal deposited may vary based on the amount of support material deposited. The alkaline earth metal/alkali metal solution can be washcoated onto the monolith substrate in one or more depositions, with each deposition followed by drying at about 80° C. for about six hours. Finally, the trap is calcined at a temperature up to about 600° C. for about six hours.

In use, the lean $NO_x$ trap of the present invention is placed in the exhaust of a vehicle having an engine which can operate in a fuel-lean condition and which contains $NO_x$ and other harmful gases. The trap is exposed to the exhaust gases from the engine operating in a fuel-lean condition and operating in a fuel-rich condition such that at least a portion of the $NO_x$ in the gas is converted to $N_2$, preferably at a temperature between about 125° C. and 700° C.

In order that the invention may be more readily understood, reference is made to the following examples of compositions within the scope of the present invention, which examples are intended to be illustrative of the invention, but are not intended to be limiting in scope.

EXAMPLE 1

A series of lean $NO_x$ traps (LNT) utilizing a ruthenium catalyst, an alumina support, and including different ratios of Ba and K were formed in accordance with the present invention. The catalysts were prepared using a wet impregnation method. The LNTs contained 2% by weight of washcoat of Ru impregnated from $Ru(NO)(NO_3)_3$ and dried at 80° C. and calcined at 600° C. under reducing conditions for 6 hours. Barium (from barium acetate) and potassium (from potassium nitrate) were then coated on the support and dried and calcined under the same conditions.

The testing was conducted in a tubular flow reactor. A core of monolith (400 cells) model LNT (approximately ¾ inch in diameter and 1 inch long) was used for testing. The feedgas used contained 500 ppm $NO_x$, 10% $CO_2$, 10% $H_2O$ and $N_2$. The feedgas cycled between lean and rich conditions in 60 second lean and 10 second rich. During the lean cycle, the feedgas contained 5% $O_2$. During the rich cycle, it contained approximately 5% CO and 1.67% $H_2$. The space velocity was approximately 25,000 $hr^{-1}$. Reaction temperature was measured using a thermocouple ½ inch ahead of the sample core.

Figure 1:
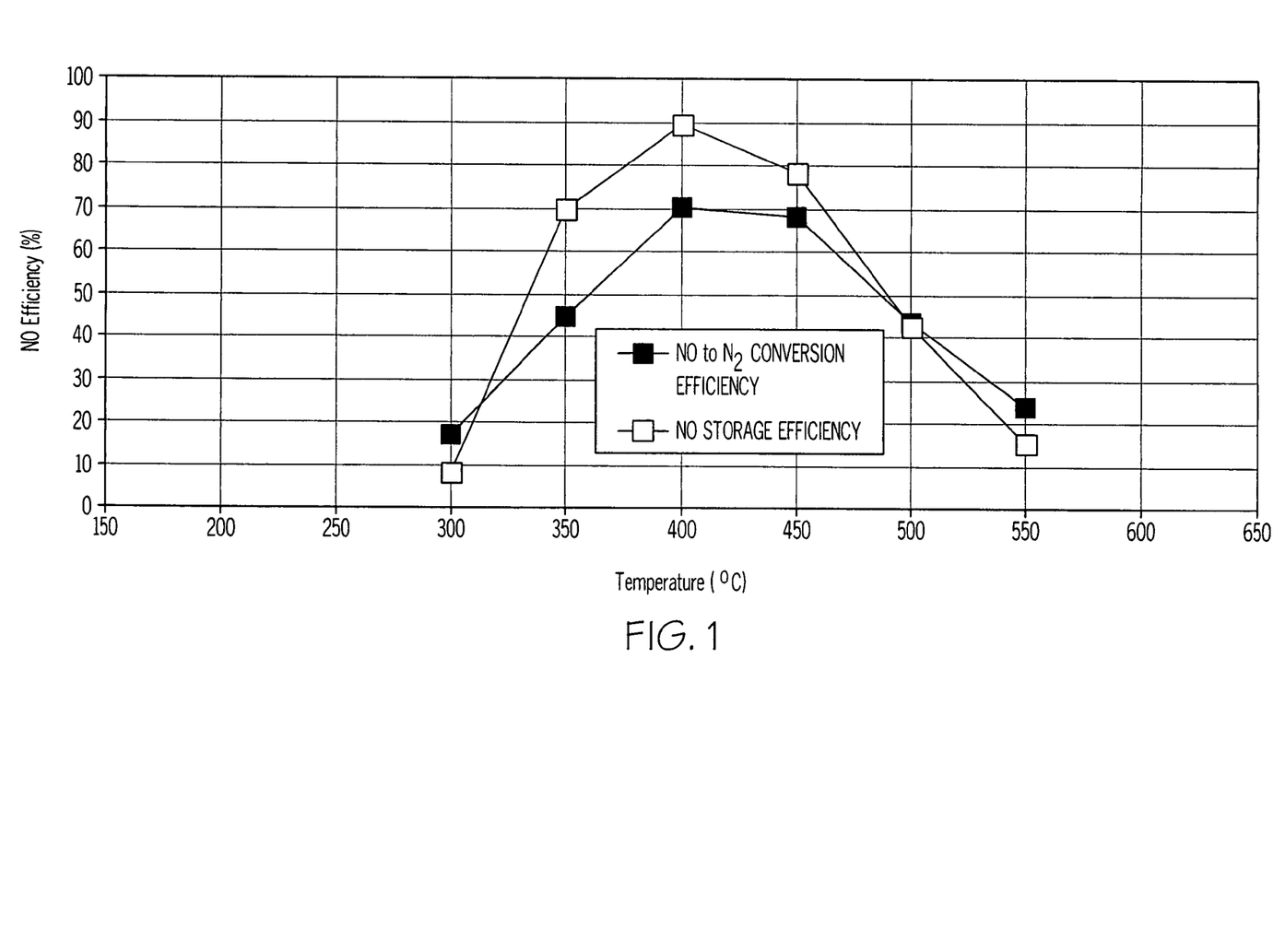
FIG. 1 is a graph illustrating $NO_x$ storage efficiency and overall $NO_x$ conversion efficiency using Ba only.

The $NO_x$ storage and conversion efficiency of a lean $NO_x$ trap containing Ru and Ba only are shown in FIG. 1. The storage efficiency is relatively high at around 90% between about 350 to 450° C. However, the total conversion efficiency is only around 70% over the same temperature range.

FIGS. 2 and 3 show the storage and conversion efficiency of lean $NO_x$ traps containing Ru, Ba, and K. The storage efficiency is much higher (up to about 98%) over a wider temperature range of about 300 to 550° C. In addition, the total $NO_x$ conversion efficiency does not decrease significantly over the 300 to 500° C. temperature range.

Figure 4:
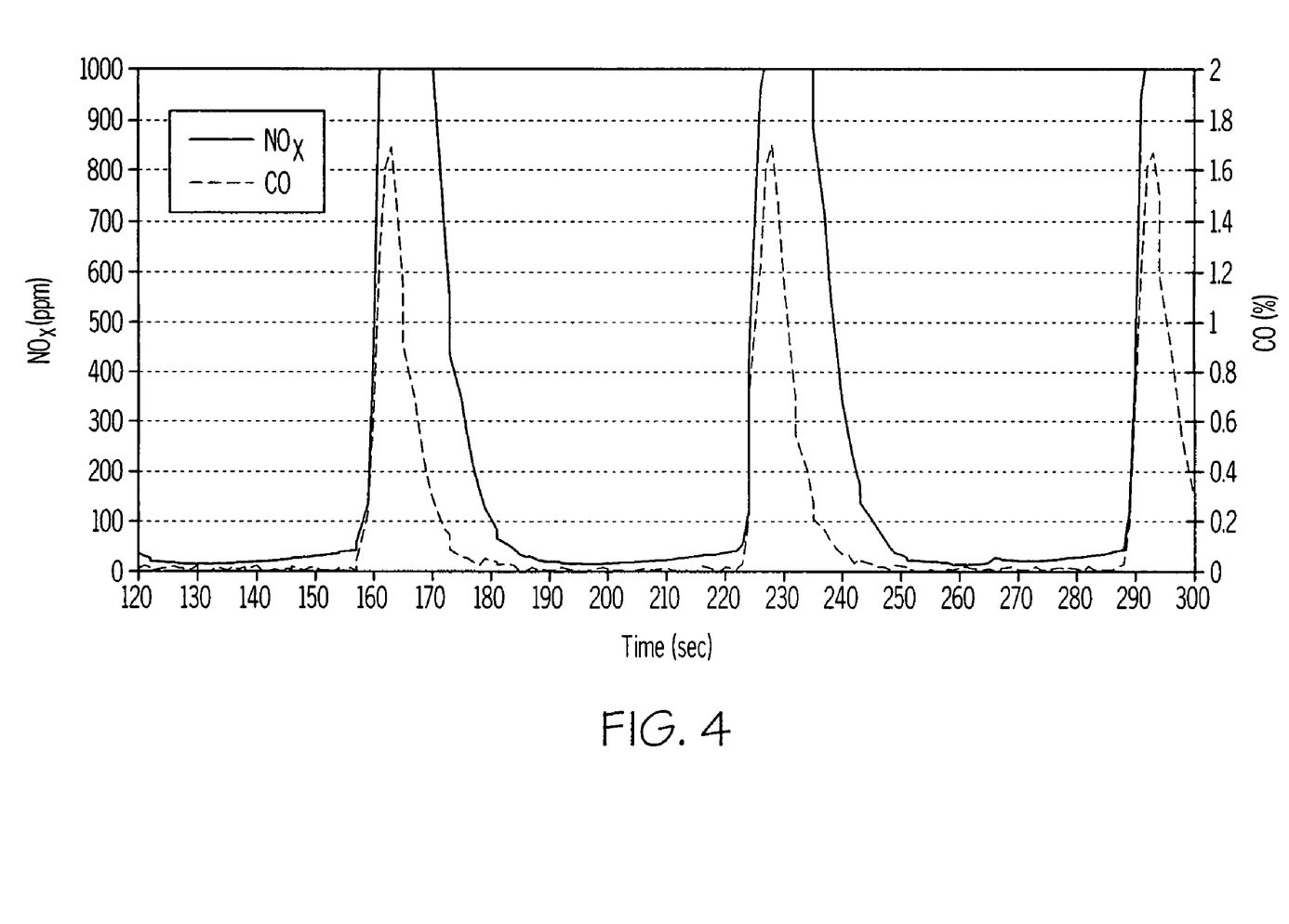
FIGS. 4 and 5 are graphs illustrating the occurrence of $NO_x$ spikes in a lean $NO_x$ trap with and without the inclusion of an alkali metal.
Figure 5:
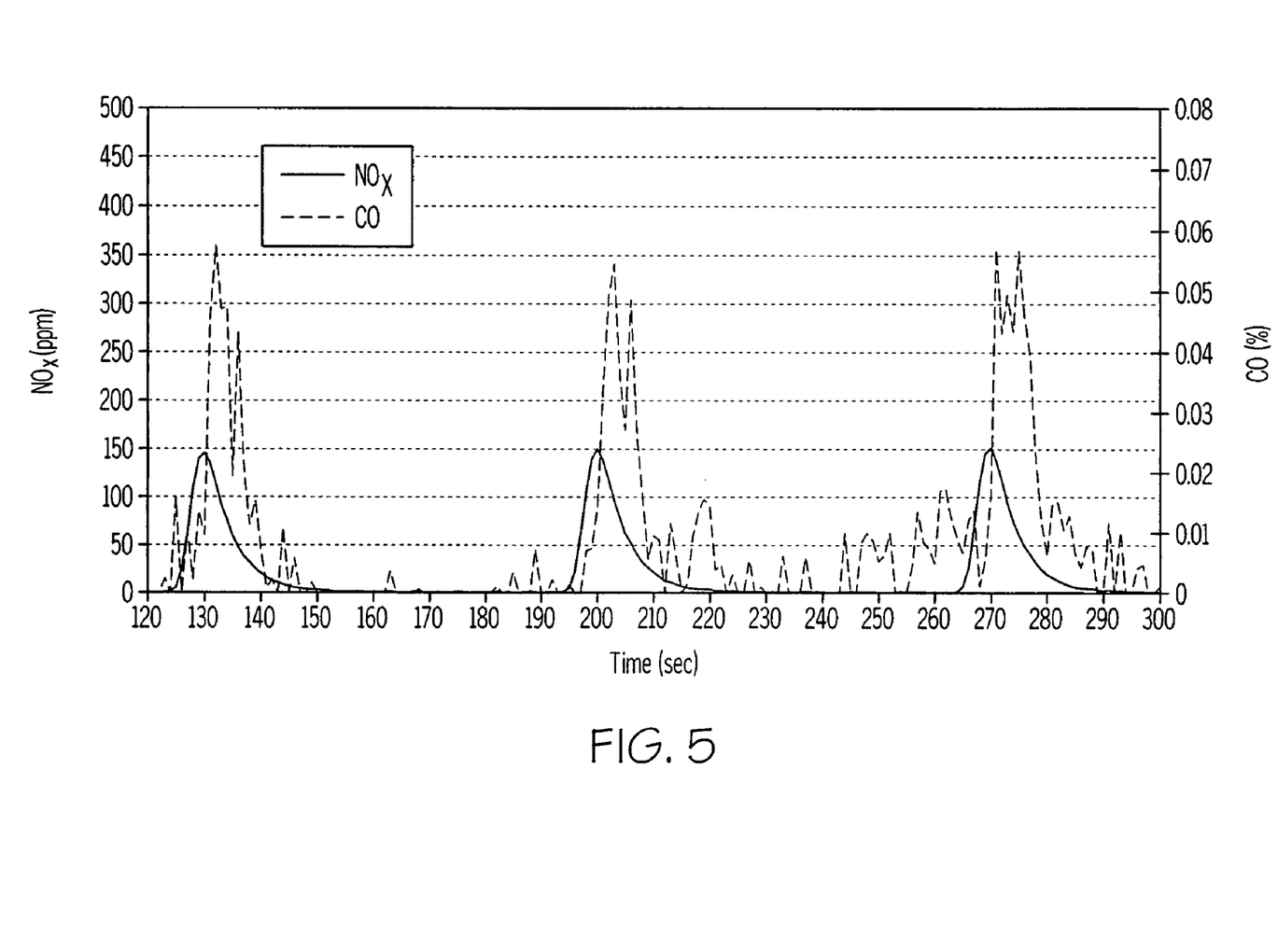

FIG. 4 illustrates the second by second concentrations of $NO_x$ and CO after the feedgas passed the two model traps. FIG. 4 shows that when the feedgas is switched from lean to rich, there is a hugh $NO_x$ spike (exceeding the measurement range) for the reference LNT comprised of Ru and Ba on alumina. As can be seen from FIG. 5, when using the LNT of the present invention, there are only minor $NO_x$ spikes which occur when the feedgas is switched from a lean to a rich condition.

While certain representative embodiments and details have been shown for purposes of illustrating the invention, it will be apparent to those skilled in the art that various changes in the compositions and methods disclosed herein may be made without departing from the scope of the invention.

The invention claimed is:

1. A lean $NO_x$ trap composition comprising:
   a support material;
   a ruthenium catalyst wherein the ruthenium catalyst free of other precious metals;
   a $NO_x$ absorbent material comprising an alkaline earth metal; and
   an alkali metal;
   wherein the lean $NO_x$ trap composition has a storage efficiency of at least 90% over a temperature range of about 400° C. to about 550° C., and a conversion efficiency of at least 70% over a temperature range of about 400° C. to about 550° C.

2. The lean $NO_x$ trap composition of claim 1 wherein the lean $NO_x$ trap composition has the storage efficiency of at least 90% over a temperature range of about 400° C. to about 550° C., and the conversion efficiency of at least 80% over a temperature range of about 400° C. to about 550° C.

3. The lean $NO_x$ trap composition of claim 1 wherein the lean $NO_x$ trap composition has a storage efficiency of at least 95% over the temperature range of about 400° C. to about 550° C., and a conversion efficiency of at least 90% over a temperature range of about 400° C. to about 550° C.

4. The lean $NO_x$ trap composition of claim 1 wherein the ruthenium catalyst is selected from ruthenium, or ruthenium oxide.

5. The lean $NO_x$ trap composition of claim 1 wherein the lean $NO_x$ trap composition comprises about 0.1 to about 10% by weight of washcoat of ruthenium catalyst.

6. The lean $NO_x$ trap composition of claim 1 wherein the lean $NO_x$ trap composition comprises about 5 to about 50% by weight of washcoat of alkaline earth metal.

7. The lean $NO_x$ trap composition of claim 6 wherein the alkaline earth metal is barium.

8. The lean $NO_x$ trap composition of claim 7 wherein barium is applied using a precursor selected from barium oxide, barium carbonate, barium nitrate, or barium acetate.

9. The lean $NO_x$ trap composition of claim 1 wherein the alkali metal is selected from cesium, lithium, and potassium.

10. The lean $NO_x$ trap composition of claim 1 wherein the lean $NO_x$ trap composition comprises about 5 to about 50% by weight of washcoat of alkali metal.

11. The lean $NO_x$ trap composition of claim 1 wherein a weight ratio of the alkaline earth metal to the alkali metal is from about 90:10 to about 10:90.

12. The lean $NO_x$ trap composition of claim 1 wherein a weight ratio of the alkaline earth metal to the alkali metal is from about 80:20 to about 20:80.

13. The lean $NO_x$ trap composition of claim 1 wherein a weight ratio of the alkaline earth metal to the alkali metal is from about 60:40 to about 40:60.

14. The lean $NO_x$ trap composition of claim 1 wherein the ruthenium catalyst is prepared from a chlorine-free precursor.

15. The lean $NO_x$ trap composition of claim 1 wherein the lean NOx trap composition has the conversion efficiency of at least 80% over a temperature range of about 400° C. to about 550° C.

16. A lean $NO_x$ trap composition comprising:
   a support material;
   about 0.1 to about 10% by weight of washcoat of a ruthenium catalyst free of other precious metals;
   about 5 to about 50% by weight of washcoat of a $NO_x$ absorbent material comprising an alkaline earth metal; and
   about 5 to about 50% by weight of washcoat of an alkali metal;
   wherein the lean $NO_x$ trap composition has a storage efficiency of at least 90% over a temperature range of about 400° C. to about 550° C., and a conversion efficiency of at least 70% over the temperature range of about 400° C. to about 550° C., wherein a ratio of the alkaline earth metal to the alkali metal is from about 60:40 to about 40:60.

17. The lean NOx trap composition of claim 16 wherein the lean NOx trap composition has the conversion efficiency of at least 80% over a temperature range of about 400° C. to about 550° C.

18. A method of removing harmful gases from an automobile exhaust containing $NO_x$, CO, and hydrocarbons, the method comprising:
   contacting a lean $NO_x$ trap composition with a first exhaust gas mixture, the first exhaust gas mixture comprising exhaust gases from an internal combustion engine operating in a fuel-lean condition, the lean $NO_x$ trap composition comprising:
a support material;
a ruthenium catalyst wherein the ruthenium catalyst free of other precious metals;
a $NO_x$ absorbent material comprising an alkaline earth metal; and
an alkali metal;
wherein the lean $NO_x$ trap composition has a storage efficiency of at least 90% over a temperature range of about 400° C. to about 550° C., and a conversion efficiency of at least 70% over the temperature range of about 400° C. to about 550° C.; and
contacting the lean $NO_x$ trap composition with a second exhaust mixture, the second exhaust gas mixture comprising exhaust gases from the internal combustion engine operating in a fuel-rich condition.

19. The method of claim 18 wherein the lean $NO_x$ trap composition has a storage efficiency of at least 90% at a temperature in a range of from about 400° C. to about 550° C., and a conversion efficiency of at least 80% over a temperature range of about 400° C. to about 550° C.

20. The method of claim 18 wherein the lean $NO_x$ trap composition has a storage efficiency of at least 95% over the temperature range of about 400° C. to about 550° C., and a conversion efficiency of at least 90% over a temperature range of about 400° C. to about 550° C.

21. The method of claim 18 further comprising coating a substrate with a protective layer before depositing the lean $NO_x$ trap composition.

22. The method of claim 18 wherein the lean $NO_x$ trap composition is applied to a substrate by washcoating.

23. The method of claim 18 wherein the ruthenium catalyst is applied before the alkaline earth metal.

24. A vehicle exhaust system implementing the method of claim 18.

25. The method of claim 18 wherein the lean NOx trap composition has the conversion efficiency of at least 80% over a temperature range of about 400° C. to about 550° C.

* * * * *